(12) United States Patent
Chen (10) Patent No.: US 12,052,780 B2
(45) Date of Patent: Jul. 30, 2024

(54) METHOD OF DATA TRANSMISSION BETWEEN BLUETOOTH TWS DEVICES, AND BLUETOOTH TWS DEVICE

(71) Applicant: ACTIONS (ZHUHAI) MICROELECTRONICS CO., LIMITED, Zhuhai (CN)

(72) Inventor: Jinhong Chen, Zhuhai (CN)

(73) Assignee: ACTIONS (ZHUHAI) MICROELECTRONICS CO., LIMITED, Zhuhai (CN)

( * ) Notice: Subject to any disclaimer, the term of this patent is extended or adjusted under 35 U.S.C. 154(b) by 546 days.

(21) Appl. No.: 17/420,680

(22) PCT Filed: Sep. 23, 2020

(86) PCT No.: PCT/CN2020/117084
§ 371 (c)(1),
(2) Date: Jul. 5, 2021

(87) PCT Pub. No.: WO2021/208358
PCT Pub. Date: Oct. 21, 2021

(65) Prior Publication Data
US 2022/0264672 A1    Aug. 18, 2022

(30) Foreign Application Priority Data
Apr. 17, 2020    (CN) .......................... 202010306148.3

(51) Int. Cl.
*H04W 76/14* (2018.01)
*H04L 5/00* (2006.01)
*H04W 4/80* (2018.01)

(52) U.S. Cl.
CPC ........... *H04W 76/14* (2018.02); *H04L 5/0053* (2013.01); *H04W 4/80* (2018.02)

(58) Field of Classification Search
CPC ....... H04R 3/12; H04R 2420/07; H04W 4/80; H04W 36/30; H04S 1/005
See application file for complete search history.

(56) References Cited

U.S. PATENT DOCUMENTS 10,244,307 B1 *   3/2019  Tong ..................... H04R 1/1091
10,368,169 B1 *   7/2019  Linsky ..................... H04R 3/12
(Continued)

FOREIGN PATENT DOCUMENTS

CN       1758617 A    4/2006
CN     109660971 A    4/2019
(Continued)

*Primary Examiner* — Yee F Lam
(74) *Attorney, Agent, or Firm* — Bayramoglu Law Offices LLC (57) ABSTRACT

A method of data transmission between Bluetooth TWS devices includes the following steps: establishing a real connection between a first device and a Bluetooth device; establishing a virtual connection between a second device and the Bluetooth device; switching the first device to a state of receiving a first auxiliary frame, after the first device and the second device receiving a data package from the Bluetooth device at an N-th Bluetooth link time slot; and transmitting a second auxiliary frame to the second device from the first device at an (N+1)-th Bluetooth link time slot. Further provided is a Bluetooth TWS device including the first device and the second device. The inventions are used for reducing power consumption of the first device.

19 Claims, 5 Drawing Sheets

(56) References Cited

U.S. PATENT DOCUMENTS

| | | | | |
|---|---|---|---|---|
| 10,588,167 | B1* | 3/2020 | Chen | H04W 56/0015 |
| 10,784,993 | B1* | 9/2020 | Batra | H04L 49/90 |
| 11,425,769 | B2* | 8/2022 | Yu | H04R 1/1041 |
| 2014/0329468 | A1 | 11/2014 | Watson et al. | |
| 2017/0366924 | A1* | 12/2017 | Thoen | H04M 1/724 |
| 2018/0084456 | A1* | 3/2018 | Gostev | H04L 1/1867 |
| 2018/0084606 | A1* | 3/2018 | Li | H04W 88/04 |
| 2018/0184234 | A1 | 6/2018 | Chen et al. | |
| 2018/0367243 | A1* | 12/2018 | Hsieh | H04W 72/04 |
| 2019/0007153 | A1* | 1/2019 | Linsky | H04J 3/1682 |
| 2019/0044576 | A1* | 2/2019 | Thoen | H04M 1/6066 |
| 2019/0230459 | A1* | 7/2019 | Sridharan | G06F 3/16 |
| 2019/0327778 | A1 | 10/2019 | Morris et al. | |
| 2020/0359134 | A1* | 11/2020 | Tong | H04R 5/04 |

FOREIGN PATENT DOCUMENTS

| | | |
|---|---|---|
| CN | 110166988 A | 8/2019 |
| CN | 110191442 A | 8/2019 |
| CN | 110602675 A | 12/2019 |
| CN | 111556476 A | 8/2020 |

\* cited by examiner

METHOD OF DATA TRANSMISSION BETWEEN BLUETOOTH TWS DEVICES, AND BLUETOOTH TWS DEVICE

CROSS REFERENCE TO THE RELATED APPLICATIONS

This application is the national phase entry of International Application No. PCT/CN2020/117084, filed on Sep. 23, 2020, which is based upon and claims priority to Chinese Patent Application No. 202010306148.3, filed on Apr. 17, 2020, the entire contents of which are incorporated herein by reference.

TECHNICAL FIELD

The present invention generally relates to wireless communication technology fields, and especially relates to a method of data transmission between Bluetooth TWS devices, and a Bluetooth TWS device.

BACKGROUND

TWS (True Wireless Stereo) earphones have become more and more popular in recent years. TWS technology is based on the development of Bluetooth chip technology. According to working principle of the TWS technology, it means that a mobile phone is connected to a master earphone, and the master earphone is connected to a slave earphone in a wireless way, so as to realize wireless separation of a left channel and a right channel of Bluetooth headsets. When the slave earphone is not connected, the Bluetooth headsets returns to a mono mode. The TWS technology has been applied to the field of Bluetooth headsets, and so a new product TWS Bluetooth headset emerges.

Currently, the mainstream TWS devices on the market are realized by forwarding. That is, the mobile phone transmits audio data to a first device, and then the first device forwards the received audio data to a second device. This way causes the power consumption of the first device to be large, and all audio data are forwarded, thus wasting Bluetooth bandwidth, reducing the performance of the TWS device, and increasing the audio output delay.

SUMMARY

In view of this, a main objective of an embodiment of the present invention is to provide a method of data transmission between Bluetooth TWS (True Wireless Stereo) devices for reducing power consumption of the first device. The embodiment of the present invention is implemented as follows. A method of data transmission between Bluetooth TWS devices includes:

establishing a real connection between a first device and a Bluetooth device, and establishing a virtual connection between a second device and the Bluetooth device;

switching the first device to a state of receiving a first auxiliary frame, after the first device and the second device receiving a data package from the Bluetooth device at an N-th Bluetooth link time slot; and transmitting a second auxiliary frame to the second device from the first device at an (N+1)-th Bluetooth link time slot.

Optionally, after the step of the first device and the second device receiving a data package from the Bluetooth device at an N-th Bluetooth link time slot, the method further includes:

switching the second device to a state of transmitting the first auxiliary frame; and switching the second device to a state of receiving the second auxiliary frame, after the second device transmitting the first auxiliary frame to the first device.

Optionally, the first auxiliary frame includes at least one of a forwarding request flag command, a first segment checking information command, a command of requesting to communicate with the Bluetooth device, and a requesting data transmitting command; and the second auxiliary frame includes at least one of a communication switching command, the forwarding request flag command, a second segment checking information command, and a command of accepting to communicate with the Bluetooth device.

Optionally, the method further includes: the first auxiliary frame including the forwarding request flag command, when the second device establishes the virtual connection with the Bluetooth device and the second device fails to correctly receive the data package transmitted from the Bluetooth device.

Optionally, the method further includes:

while receiving the forwarding request flag command, the first device transmitting an NAK (negative acknowledgment) signal to the Bluetooth device, to request the Bluetooth device to retransmit the data package, if the first device fails to correctly receive the data package from the Bluetooth device;

while receiving the forwarding request flag command, the first device transmitting the NAK signal to the Bluetooth device, to request the Bluetooth device to retransmit the data package, if the first device correctly receives the data package from the Bluetooth device, and the first device determines not to forward the data package to the second device; and while receiving the forwarding request flag command, the first device transmitting an ACK (acknowledge character) signal or the NAK signal to the Bluetooth device, and forwarding the data package to the second device, if the first device correctly receives the data package from the Bluetooth device, and the first device determines to forward the data package to the second device.

Optionally, the method further includes:

determining whether a communication quality of a current TWS link is better than a communication quality between the first device and the Bluetooth device or between the second device and the Bluetooth device;

if yes, the first device forwarding data to the second device or the second device forwarding data to the first device; or if no, the first device does not forwarding data to the second device or the second device does not forwarding data to the first device.

Optionally, the method further includes:

when the first device completely receives data from the Bluetooth device and the second device fails to completely receive the data from the Bluetooth device, the first auxiliary frame including the first segment checking information command of the data received by the second device from the Bluetooth device, and the first device comparing the first segment checking information command with a first checking information generated by the data completely received by the first device from the Bluetooth device, to determine a first error data segment of the second device; and when the second device completely receives the data from the Bluetooth device and the first device fails to completely receive the data from the Bluetooth device, the second auxiliary frame including the second segment checking information command of the data received by the first device from the Bluetooth device, and the second device comparing the second segment checking information command with a second checking information generated by the data completely received by the second device from the Bluetooth device, to determine a second error data segment of the first device.

Optionally, the method further includes:
the first error data segment forwarded from the first device to the second device, or the second error data segment forwarded from the second device to the first device.

Optionally, the method further includes:
when the second device is needed to directly communicate with the Bluetooth device, the first auxiliary frame including the command of requesting to communicate with the Bluetooth device, and the first device determining whether to accept the command of requesting to communicate with the Bluetooth device, according to a current link situation, if yes, the second auxiliary frame including the command of accepting to communicate with the Bluetooth device transmitted from the first device to the second device.

Optionally, the method further includes:
the command of accepting to communicate with the Bluetooth device including a one-bit acceptance flag and two-bit flow control information, and the flow control information includes a response flag ARQN and a data sequence number SEQN for establishing the real connection with the Bluetooth device.

Optionally, the method further includes:
at an (N+2)-th Bluetooth link time slot, the second device waiting to receive the first auxiliary frame transmitted from the first device; if the first auxiliary frame is received, it is indicated that the virtual connection is successfully switched to a real link by the second device, and the real connection is established between the second device and the Bluetooth device; and
at an (N+3)-th Bluetooth link time slot, the first device waiting to receive the second auxiliary frame transmitted from the second device; if the second auxiliary frame is received, it is indicated that the real connection is successfully switched to a virtual link by the first device, and the virtual connection is established between the first device and the Bluetooth device.

Optionally, the method further includes:
when the second device is needed to transmit additional data to the first device, the first auxiliary frame including the requesting data transmitting command; and the first device determining whether to transmit the second auxiliary frame according to a current link situation; if yes, the second auxiliary frame including the communication switching command transmitted from the first device to the second device.

Optionally, the method further includes:
when the real connection is established between the first device and the Bluetooth device and the first device fails to correctly receive the data package from the Bluetooth device, the second auxiliary frame including the forwarding request flag command.

Optionally, the method further includes:
the first device determining whether the data package is correctly received by the second device, according to the first auxiliary frame.

Optionally, the method further includes:
when the first device is needed to transmit an additional data to the second device, the first device determining whether to transmit the second auxiliary frame according to a current link situation; if yes, the second auxiliary frame including the communication switching command transmitted from the first device to the second device.

Optionally, the step of establishing a virtual connection between a second device and the Bluetooth device includes:
the second device established connection with the first device, to obtain parameters of establishing connection with the Bluetooth device.

Optionally, the step of the second device established connection with the first device, to obtain parameters of establishing connection with the Bluetooth device includes:
the first device establishing a Bluetooth communication connection with the second device, and transmitting the parameters of establishing connection with the Bluetooth device to the second device; or
the first device broadcasting the parameters and the second device collecting the parameters by scanning; or
the second device obtaining the parameters from the first device through an OOB (out of band) communication way; or
the first device transmitting the parameters to a third device and the second device obtaining the parameters from the third device.

According to another aspect of an embodiment of the present invention, an objective of the embodiment of the present invention is to provide a Bluetooth TWS device for reducing power consumption of the first device. The embodiment of the present invention is implemented as follows. The Bluetooth TWS device includes:
a first device configured to establish a real connection with the Bluetooth device, to be switched to a state of receiving a first auxiliary frame, after receiving a data package from the Bluetooth device at an N-th Bluetooth link time slot; and to transmit a second auxiliary frame to the second device at an (N+1)-th Bluetooth link time slot; and
a second device configured to establish a virtual connection with the Bluetooth device, to be switched to a state of transmitting the first auxiliary frame, after receiving the data package from the Bluetooth device at the N-th Bluetooth link time slot; and to be switched to a state of receiving the second auxiliary frame, after transmitting the first auxiliary frame to the first device.

According to the above technical solution, the embodiments of the present invention have the following effects that: the first device establishes the real connection with the Bluetooth device, and the second device obtains some relevant parameters of a wireless link from the first device directly or indirectly, the second device establishes the virtual connection with the Bluetooth device according to the parameters. The first device and the second device establish a TWS link through technical features of the first auxiliary frame and the second auxiliary frame, so as to perform data forwarding, data response or other data requests between the TWS devices. The virtual connection can receive the data transmitted from the Bluetooth device to the first device, and can also be switched into the real connection through the TWS link when needed, to transmit data to the Bluetooth device. The first device and the second device simultaneously receive data from the Bluetooth device, and perform real Bluetooth transmission, which greatly saves the power consumption of the first device, saves Bluetooth bandwidth, reduces data flow traffic, and improves the performance of the TWS devices. When the TWS devices do not accurately receive the data, the data are forwarded between the first device and the second device, so as to save the Bluetooth bandwidth and improve communication efficiency between the TWS devices.

BRIEF DESCRIPTION OF THE DRAWINGS

By reading the detailed description of the non-limiting embodiments with reference to the following drawings, other features, purposes and advantages of the invention will become more apparent.

DETAILED DESCRIPTION OF THE EMBODIMENTS

The present invention will be further described in detail below with reference to the drawings and embodiments. It can be understood that specific embodiments described here are only used to explain the present invention, but not to limit the present invention. In addition, it should be noted that, for ease of description, only the parts related to the present invention are illustrated in the drawings.

It should be noted that, the embodiments in the present invention and the features in the embodiments can be combined with each other if there is no conflict. The present invention will be described in detail below with reference to the drawings and in conjunction with the embodiments, and the sequence of steps in the following embodiments is only an example, and can be adjusted if there is no conflict.

Figure 1:
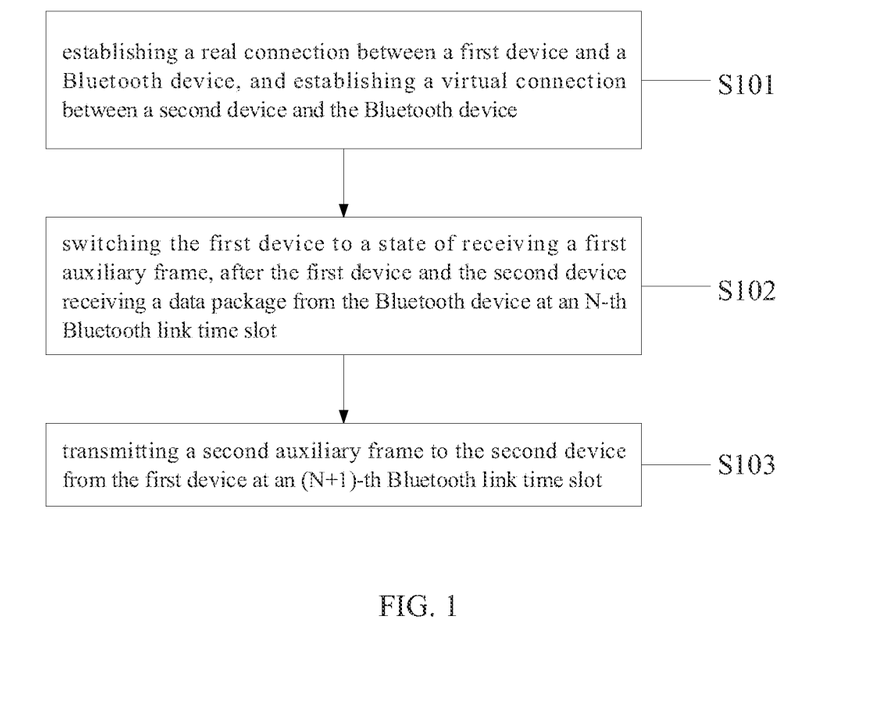
FIG. 1 is a flow chart of a method of data transmission between Bluetooth TWS devices provided by the present invention.

As illustrated in FIG. 1, an embodiment of the present invention is implemented as follows: a method of data transmission between Bluetooth TWS devices including:

S101, establishing a real connection between a first device and a Bluetooth device, and establishing a virtual connection between a second device and the Bluetooth device;

S102, switching the first device to a state of receiving a first auxiliary frame, after the first device and the second device receiving a data package from the Bluetooth device at an N-th Bluetooth link time slot; and S103, transmitting a second auxiliary frame to the second device from the first device at an (N+1)-th Bluetooth link time slot.

Figure 5:
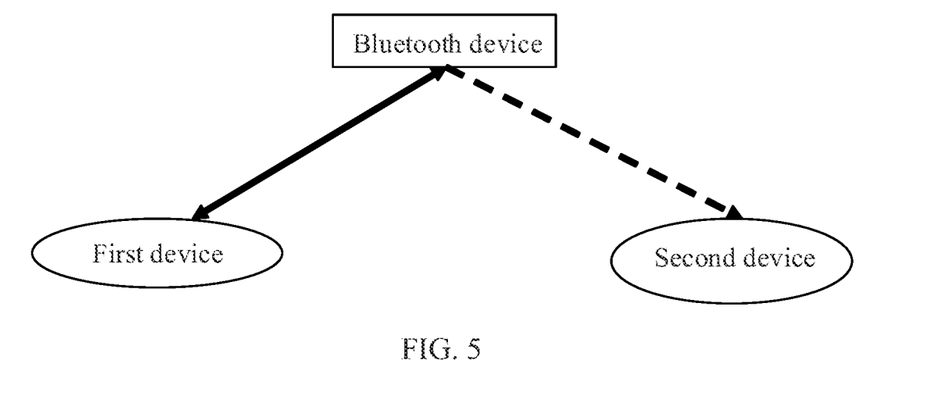
FIG. 5 is schematic diagram illustrating connection between the Bluetooth TWS devices and the Bluetooth device provided by the present invention.

The step of establishing a virtual connection between a second device and the Bluetooth device includes: the second device establishing connection with the first device, to obtain parameters of establishing connection with the Bluetooth device; and the second device establishing the virtual connection with the Bluetooth device, according to the parameters of establishing connection with the Bluetooth device. As illustrated in FIG. 5, the first device establishes the real connection with the Bluetooth device, the parameters of establishing connection with the Bluetooth device includes some relevant parameters of a wireless link, and the second device obtains the relevant parameters of the virtual link from the first device directly or indirectly, to establish the virtual connection with the Bluetooth device. The virtual connection can receive data transmitted from the Bluetooth device to the first device, and can also be switched into the real connection when needed, to transmit data to the Bluetooth device. A standard Bluetooth ACL link established between the first device and the Bluetooth device is the real connection between the first device and the Bluetooth device.

The step of the second device establishing connection with the first device, to obtain parameters of establishing connection with the Bluetooth device includes: the first device establishing a Bluetooth communication connection with the second device, and transmitting the parameters of establishing connection with the Bluetooth device to the second device; or the first device broadcasting the parameters and the second device collecting the parameters by scanning; or the second device obtaining the parameters from the first device through an OOB (out of band) communication way; or the first device transmitting the parameters to a third device, and the second device obtains the parameters from the third device. The second device establishes the virtual connection, according to the parameters, so as to receive the data transmitted from the Bluetooth device to the first device.

Figure 2:
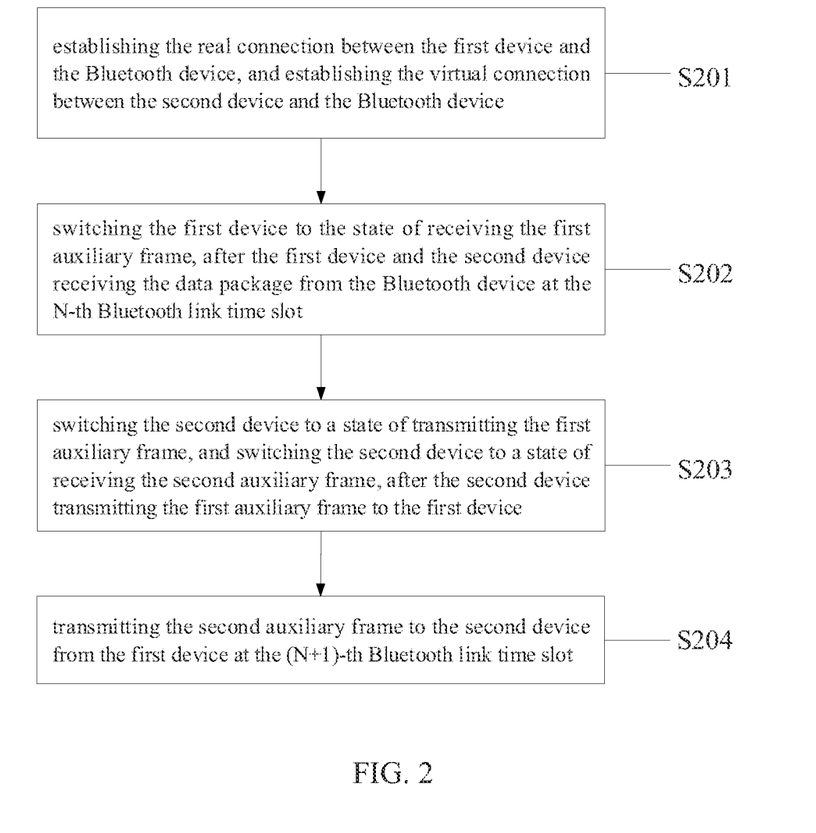
FIG. 2 is a flow chart of another method of data transmission between the Bluetooth TWS devices provided by the present invention.

The present invention provides another embodiment based on the above embodiment. In the another embodiment, as illustrated in FIG. 2, another method of data transmission between the Bluetooth TWS devices includes:

S201, establishing the real connection between the first device and the Bluetooth device, and establishing the virtual connection between the second device and the Bluetooth device;

S202, switching the first device to the state of receiving the first auxiliary frame, after the first device and the second device receiving the data package from the Bluetooth device at the N-th Bluetooth link time slot;

S203, switching the second device to a state of transmitting the first auxiliary frame, and switching the second device to a state of receiving the second auxiliary frame, after the second device transmitting the first auxiliary frame to the first device; and S204, transmitting the second auxiliary frame to the second device from the first device at the (N+1)-th Bluetooth link time slot.

Figure 3:
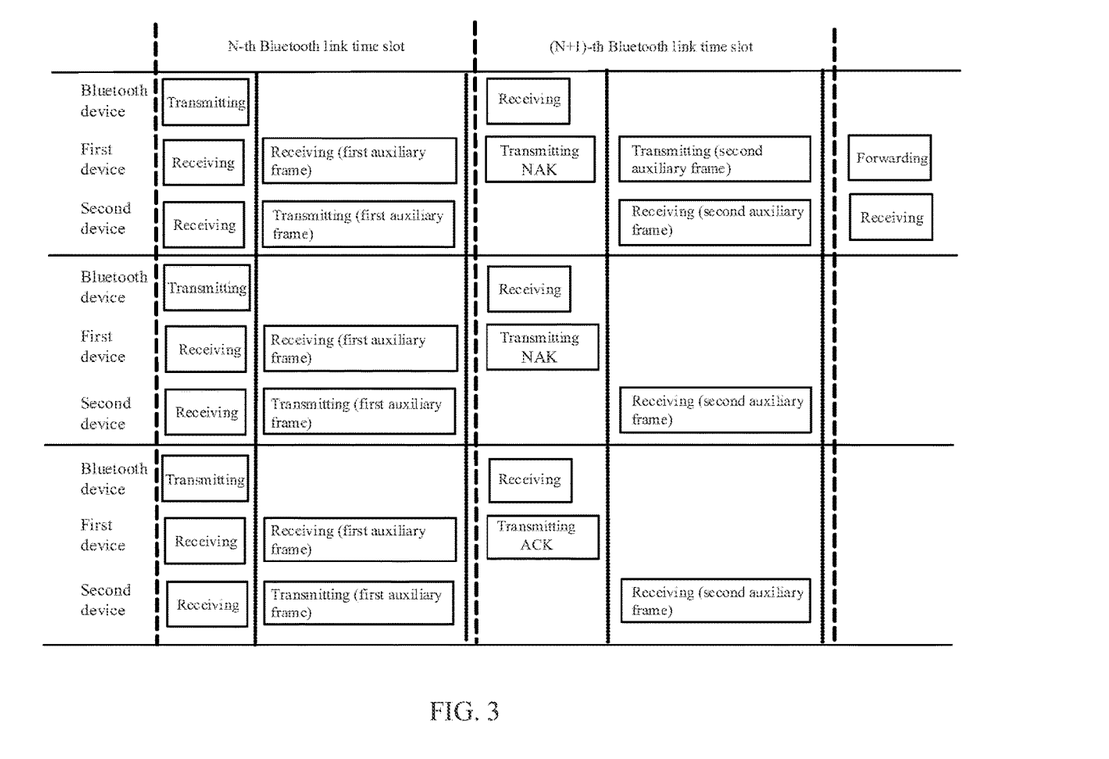
FIG. 3 is sequence diagram of a Bluetooth device communicated with the TWS devices provided by the present invention.

The flow of the above-mentioned embodiment will be described in detail below in conjunction with FIG. 3. The first device establishes the real connection with the Bluetooth device, and the second device establishes the virtual connection with the Bluetooth device. After the real connection and the virtual connection are established, and the first device and the second device receive the data package transmitted from the Bluetooth device, the first device is switched to the state of receiving the first auxiliary frame, and the first device transmits the second auxiliary frame to the second device at the (N+1)-th Bluetooth link time slot. The second device is switched to the state of transmitting the first auxiliary frame. If the first device has correctly received the data from the Bluetooth device, while the second device fails to correctly receive the data from the Bluetooth device, a forwarding request flag command will be transmitted to the first device through the first auxiliary frame. After the first device receives the forwarding request flag command, an NAK (negative acknowledgment) signal is transmitted to the Bluetooth device at the (N+1)-th Bluetooth link time slot, or the first device may not give a response. When the first device fails to successfully receive the first auxiliary frame information, it is also assumed that the second device transmits the forwarding request flag command to request for data forwarding. After transmitting the first auxiliary frame, the second device enters the state of receiving the second auxiliary frame. After transmitting an NAK signal (negative acknowledgment) to the Bluetooth device, the first device transmits a communication switching command to the second device through the second auxiliary frame, if it is determined that data need to forward for the second device. Finally, the first device and the second device are switched to TWS communication for data forwarding. If the first device determines to not forward data for the second device, the first device enters an (N+2)-th Bluetooth link time slot, to wait for receiving the next data from the Bluetooth device. After receiving the second auxiliary frame overtime, the second device enters the (N+2)-th Bluetooth link time slot, to wait for receiving the next data from the Bluetooth device. As the first device having transmitted the NAK signal to the Bluetooth device, the Bluetooth device will retransmit the data subsequently. If the second device has correctly received the data from the Bluetooth device, the first auxiliary frame transmitted to the first device does not include the forwarding request flag command. After receiving the first auxiliary frame not including the forwarding request flag command, the first device transmits an ACK (acknowledge character) signal to the Bluetooth device at the (N+1)-th Bluetooth link time slot. While not correctly receiving the data from the Bluetooth device at the N-th Bluetooth link time slot, the first device transmits the NAK signal to the Bluetooth device at the (N+1)-th Bluetooth link time slot. At the same time, if the first auxiliary frame received by the first device does not include the forwarding request flag command, the forwarding request flag command and a communication switching command can be transmitted to the second device through the second auxiliary frame while needed.

The present invention provides another embodiment, the first device or the second device can forward data at an appropriate time, and it is necessary to determine whether a communication quality of a current TWS link is better than a communication quality between the TWS devices and the Bluetooth device. When a communication quality between the first device and the second device is monitored to be good, and a communication quality between the first device and the Bluetooth device, or between the second device and the Bluetooth device is monitored to be relatively poor, the forwarding data function of the TWS devices can be started. If the communication quality between the first device and the second device is monitored to be good, and the communication quality between the first device and the Bluetooth device, or between the second device and the Bluetooth device is monitored to be relatively poor, the first device forwards data to the second device or the second device forwards data to the first device; otherwise, the first device does not forward data to the second device, or the second device does not forward data to the first device. If the first device forwards data to the second device, it is needed to determine the communication quality between the second device and the Bluetooth device; if the second device forwards data to the first device, it is needed to determine the communication quality between the first device and the Bluetooth device. The data can be forwarded, if the communication quality between the first device and the Bluetooth device, or between the second device and the Bluetooth device is determined to be worse than the communication quality of the TWS link.

The present invention provides another embodiment. In the another embodiment of the invention, the first auxiliary frame or the second auxiliary frame transmitted between the first device and the second device is mainly used to maintain the virtual link established between the second device and the Bluetooth device, and assist the communication between TWS devices. The first auxiliary frame includes at least one of the following commands: the forwarding request flag command, a first segmented checking information command, a command of requesting to communicate with the Bluetooth device, and a requesting data transmission command; and the second auxiliary frame includes at least one of the following commands: the communication switching command, the forwarding request flag command, a second segment checking information command, and a command of accepting to communicate with the Bluetooth device. When the first device correctly receives the data package transmitted from the Bluetooth device, and the second device fails to correctly receive the data package transmitted from the Bluetooth device, the second device possibly transmits the forwarding request flag command in the first auxiliary frame. The first auxiliary frame possibly includes the first segment checking information command of the data received by the second device from the Bluetooth device. When the first device correctly receives the data package transmitted from the Bluetooth device, and the second device fails to correctly receive the data package transmitted from the Bluetooth device, the first device can determine which data of segments of the second device have errors, according to the first segment checking information command, and only forward the data of the segments with errors. The first auxiliary frame may include "the command of requesting to communicate with the Bluetooth device", when the second device is needed to communicate directly with the Bluetooth device. For example, when data is needed to directly transmitted to the Bluetooth device, the second device will transmit the command of requesting to communicate with the Bluetooth device through the first auxiliary frame to the first device, and the first device determines whether to accept the command of requesting to communicate with the Bluetooth device, and gives response by transmitting the second auxiliary frame. The first auxiliary frame may include "the requesting data transmission command" of the TWS devices. When the second device has additional data needed to be transmitted to the first device, "the requesting data transmission command" will be added into the first auxiliary frame.

The present invention provides another embodiment. After receiving "the requesting data transmission command", the first device determines whether to transmit the second auxiliary frame for communication switching according to a current link situation, to receive additional data of the second device. When the second device has additional data that need to be transmitted to the first device, the first auxiliary frame includes the requesting data transmission command. The first device determines whether to transmit the second auxiliary frame according to the current link situation; if yes, the first device transmits the second auxiliary frame including the communication switching command to the second device. The additional data can include an upper-layer user data. The upper-layer user data can include synchronization of various information between TWS devices, such as fine-tuning the play speed; can include keeping a master device and a slave device to play audio data at the same time, such as synchronizing button information, synchronizing battery information, synchronizing prompt sound, synchronizing working state, etc.; can also include underlying link control data, such as frequency hopping sequence, power control; or can also include no data, such as an empty package, just to synchronize the time sequence of the TWS devices.

The present invention provides another embodiment. When the second device establishes the virtual connection with the Bluetooth device and the second device fails to correctly receive the data package transmitted from the Bluetooth device, the first auxiliary frame includes the forwarding request flag command. While receiving the forwarding request flag command, the first device transmits the NAK signal to the Bluetooth device, to request the Bluetooth device to retransmit data, if the first device fails to correctly receive the data package from the Bluetooth device; while receiving the forwarding request flag command, the first device transmits the NAK signal to the Bluetooth device, to request the Bluetooth device to retransmit data, if the first device correctly receives the data package from the Bluetooth device, and the first device determines not to forward the data package to the second device; and while receiving the forwarding request flag command, the first device transmitting an ACK(acknowledge character) signal or the NAK signal to the Bluetooth device, and forwarding the data to the second device, if the first device correctly receives the data package from the Bluetooth device, and the first device determines to forward the data package to the second device. Specifically, when the Bluetooth device transmits the data package to the first device at the N-th Bluetooth link time slot, the second device also receives the data package at the N-th Bluetooth link time slot. When the first device and the second device receive the data package transmitted from the Bluetooth device, the first device is switched to the state of receiving the first auxiliary frame, and the second device is switched to the state of transmitting the first auxiliary frame. When the first device correctly receives the data from the Bluetooth device, and receives the first auxiliary frame including the forwarding request flag command transmitted by the second device, the first device transmits the NAK signal to the Bluetooth device at the (N+1)-th Bluetooth link time slot. When the first device fails to successfully receive the first auxiliary frame information, it is also assumed that the second device transmits the requesting data transmitting command for data forwarding. After the NAK signal is transmitted, the second auxiliary frame is transmitted to the second device by the first device. After receiving the second auxiliary frame, the second device enters a state of waiting for receiving data, and the first device enters a state of forwarding data. Conversely, when the first device fails to correctly receive the data from the Bluetooth device, and receives the first auxiliary frame failing to include the forwarding request flag command transmitted by the second device, the NAK signal can be transmitted to the Bluetooth device at the (N+1)-th Bluetooth link time slot by the first device. After the NAK signal is transmitted, the second auxiliary frame is transmitted to the second device by the first device. The second device enters the state of waiting for receiving the second auxiliary frame, after transmitting the first auxiliary frame to the first device. Finally, the second device enters a forwarding state for forwarding the data package received from the Bluetooth device to the first device. If the second device has correctly received the data package from the Bluetooth device, the first auxiliary frame transmitted to the first device does not include the forwarding request flag command. If the first device has correctly received the data from the Bluetooth device, the ACK signal is transmitted to the Bluetooth device at the (N+1)-th Bluetooth link time slot.

The present invention provides another embodiment. When the first device establishes the real connection with the Bluetooth device, and fails to correctly receive the data package transmitted from the Bluetooth device, the second auxiliary frame includes the forwarding request flag command, and whether the second device has correctly received the data package is determined by the first device, according to the first auxiliary frame. If the first auxiliary frame includes the forwarding request flag command, the forwarding request flag command can be represented by one bit, for example, 1 means forwarding is requested, and 0 means forwarding is not requested. At this time, as long as the first device does not receive the first auxiliary frame, or the forwarding request flag command in the first auxiliary frame is 1, it means that the second device fails to receive the data package correctly. Conversely, if the forwarding request flag command is 0, it means that the second device has correctly received the data package, or another method is used. If the first auxiliary frame includes the first segment checking information command, it means that the second device has correctly received the data package, when the first device receives the first auxiliary frame, and the first segment checking information command in the first auxiliary frame is consistent with a first checking information, and the first checking information calculated by the first device according to the data package received from the Bluetooth device. Those skilled in the art can understand that, when the first device needs the second device to forward data to the first device, according to the current link situation, the first device transmits the forwarding request flag command to the second device. The solution is exactly the same as the solution the forwarding request flag command included in the first auxiliary frame.

The invention provides another embodiment. The first device forwards a first error data segment to the second device, or the second device forwards a second error data segment to the first device. When the first device completely receives the data from the Bluetooth device and the second device fails to completely receive the data from the Bluetooth device, the first auxiliary frame includes the first segment checking information command of the data received by the second device from the Bluetooth device, and the first device compares the first segment checking information command with the first checking information generated by the data completely received by the first device from the Bluetooth device, to determine the first error data segment of the second device. When the second device completely receives the data from the Bluetooth device and the first device fails to completely receive the data from the Bluetooth device, the second auxiliary frame includes the second segment checking information command of the data received by the first device from the Bluetooth device, and the second device compares the second segment checking information command with a second checking information generated by the data completely received by the second device from the Bluetooth device, to determine the second error data segment of the first device. The second device can determine which data of segments of the first device have errors, according to the second segment checking information command and the second checking information, and only forward the data of the segments with errors (eg. the second error data segment) to the first device. The first auxiliary frame possibly includes the first segment checking information command of the data received by the second device from the Bluetooth device. When the first device completely receives data from the Bluetooth device and the second device fails to completely receive the data from the Bluetooth device, the first device can determine which data of segments of the second device have errors, according to the first segment checking information command and the first checking information, and only forward the data of the segments with errors (eg. the second error data segment) to the second device.

The present invention provides another embodiment. When the second device is needed to directly communicate with the Bluetooth device, the first auxiliary frame includes the command of requesting to communicate with the Bluetooth device, and the first device determines whether to accept the command of requesting to communicate with the Bluetooth device, according to the current link situation, if yes, the second auxiliary frame includes the command of accepting to communicate with the Bluetooth device transmitted from the first device to the second device. Preferably, the command of accepting to communicate with the Bluetooth device includes a one-bit acceptance flag and two-bit flow control information, and the flow control information includes a response flag ARQN and a data sequence number SEQN for establishing the real connection with the Bluetooth device. At the (N+2)-th Bluetooth link time slot, the second device waits for receiving the first auxiliary frame transmitted from the first device; if the first auxiliary frame is received, it is indicated that the second device successfully switches the virtual connection to a real link, and the real connection is established between the second device and the Bluetooth device. At an (N+3)-th Bluetooth link time slot, the first device waits for receiving the second auxiliary frame transmitted from the second device; if the second auxiliary frame is received, it is indicated that the first device successfully switches the real connection to a virtual link, and the virtual connection is established between the first device and the Bluetooth device.

Specifically, when the second device is needed to communicate directly with the Bluetooth device, for example, data is needed to directly transmit to the Bluetooth device, the second device will transmit the command of requesting to communicate with the Bluetooth device through the first auxiliary frame. The first device determines whether to accept the command of requesting to communicate with the Bluetooth device, and gives response by transmitting the second auxiliary frame. The second auxiliary frame may includes "the command of accepting to communicate with the Bluetooth device". If the first device accepts the command of requesting to communicate with the Bluetooth device in the first auxiliary frame of the second device, the first device transmits "the command of accepting to communicate with the Bluetooth device" in the second auxiliary frame. The "the command of accepting to communicate with the Bluetooth device" is mainly includes the one-bit acceptance flag and the two-bit flow control information. The second device determine what the response flag ARQN and the data sequence number SEQN should be transmitted to the Bluetooth device, according to the flow control information in "the command of accepting to communicate with the Bluetooth device". The first device may reject the command of requesting to communicate with the Bluetooth device of the second device, because a data package that need to be answered is currently being transmitted to the Bluetooth device. The first device may also reject the command of requesting to communicate with the Bluetooth device of the second device, because some key processes are in progress (for example, the Bluetooth device is updating the encryption key, etc.).

Figure 4:
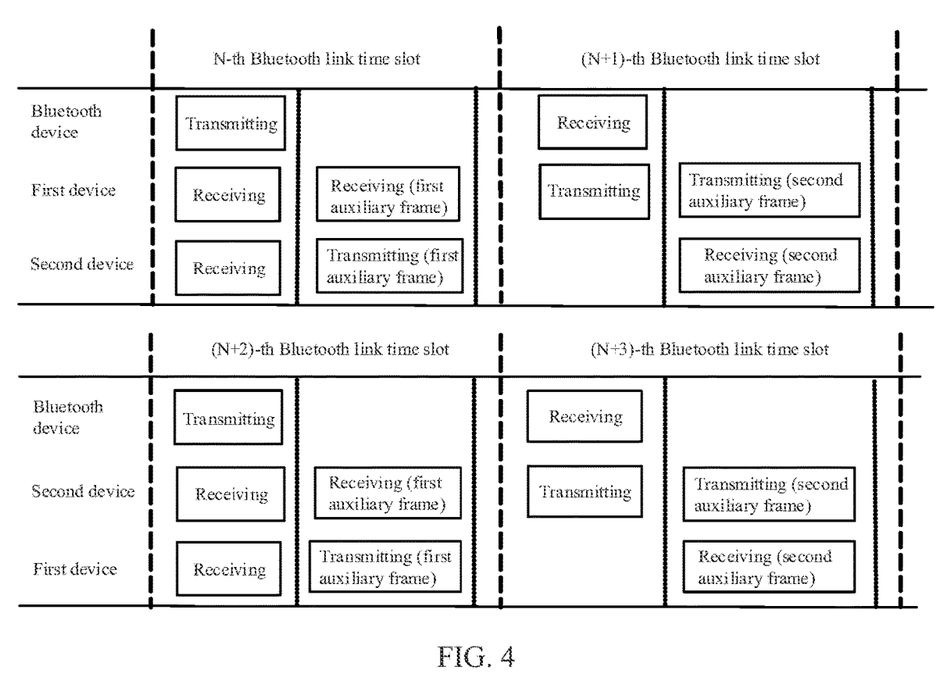
FIG. 4 is a sequence diagram of a second device switched from a virtual connection to a real connection provided by the present invention.

The process of switching the second device into the real connection will be described in detail below in conjunction with FIG. 4. The second device is needed to communicate directly with the Bluetooth device, and the second device transmits "the command of requesting to communicate with the Bluetooth device" to the first device in the first auxiliary frame at the N-th Bluetooth link time slot. After receiving the command of requesting to communicate with the Bluetooth device, the first device determines that it can accept the command of requesting to communicate with the Bluetooth device of the second device, and transmits "the command of accepting to communicate with the Bluetooth device" to the second device in the second auxiliary frame at the (N+1)-th Bluetooth link time slot. Then the first device is switched to the second device at the (N+2)-th Bluetooth link time slot, and transmits the first auxiliary frame to the second device. After receiving "the command of accepting to communicate with the Bluetooth device" from the first device at the (N+1)-th Bluetooth link time slot, the second device is switched to the first device at the (N+2)-th Bluetooth link time slot, and waits to receive the first auxiliary frame from the first device. If the second device receives the first auxiliary frame at the (N+2)-th Bluetooth link time slot, it means that the second device has successfully switched the virtual connection to the real link. In the subsequent (N+3)-th Bluetooth link time slot, the second device is needed to transmit the second auxiliary frame to the first device. The first device receives the second auxiliary frame at the (N+3)-th Bluetooth link time slot, which means that the first device has switched to the virtual connection. The first device will start a timeout after transmitting "the command of accepting to communicate with the Bluetooth device", and the second auxiliary frame is needed to be received before the timeout, to indicate that the first device switched to the second device is successful. Otherwise, after the timeout, it is restored to the first device. After receiving "the command of accepting to communicate with the Bluetooth device", the second device will start a timeout, and the first auxiliary frame is needed to be received before the timeout, to indicate that the second device switched to the first device is successful. Otherwise, after the timeout, it is restored to the second device. It can be seen that after the switching is completed, the second device becomes the first device, and the first device becomes the second device. Moreover, the connection between the second device and the Bluetooth device becomes the real connection, and the connection between the first device and the Bluetooth device becomes the virtual connection.

Correspondingly, FIG. 5 is a schematic diagram illustrating the connection between the Bluetooth TWS devices and the Bluetooth device provided by the present invention. An embodiment of the present invention provides a Bluetooth TWS device based on the foregoing embodiment, including a first device and a second device;

the first device is configured to establish a real connection with the Bluetooth device, and to be switched to a state of receiving a first auxiliary frame, after receiving a data package from the Bluetooth device at an N-th Bluetooth link time slot; the first device is further configured to transmit a second auxiliary frame to the second device at an (N+1)-th Bluetooth link time slot;

the second device is configured to establish a virtual connection with the Bluetooth device, to be switched to a state of transmitting the first auxiliary frame, after receiving the data package from the Bluetooth device at the N-th Bluetooth link time slot, and to be switched to a state of receiving the second auxiliary frame, after transmitting the first auxiliary frame to the first device.

According to the embodiments provided by the present invention, the first device establishes the real connection with the Bluetooth device, and the second device obtains some relevant parameters of the wireless link from the first device directly or indirectly, the second device establishes the virtual connection with the Bluetooth device according to the relevant parameters of the wireless link. The virtual connection can receive the data transmitted from the Bluetooth device to the first device, and can also be switched into the real connection through the first auxiliary frame, to transmit data to the Bluetooth device. Therefore, whether it is the first device or the second device in the embodiments of the present invention, it is described from a perspective of the master-slave devices implemented in the data transmission process. According to the description of the above technical solution, the first device can be switched to the second device, and the second device can also be switched into the first device. Those skilled in the art can understand that the first device and the second device described here are for a data transmission perspective, and do not actually refer to a master earphone or a slave earphone of a TWS earphone.

The above description is only another embodiment of the invention and an explanation of the applied technical principles. Those skilled in the art should understand that the scope of the invention involved in this application is not limited to the technical solution formed by the specific combination of the above technical features, and should also cover other technical solutions formed by any combination of above technical features or equivalent features thereof without departing from the inventive concept. For example, the above-mentioned features and the technical features disclosed in this application (but not limited to) with similar functions are mutually replaced to form a technical solution.

What is claimed is:

1. A method of data transmission between Bluetooth True Wireless Stereo (TWS) devices, comprising:
    establishing a real connection between a first device and a Bluetooth device;
    establishing a virtual connection between a second device and the Bluetooth device;
    switching the first device to a state of receiving a first auxiliary frame from the second device, after the first device and the second device receiving a data package from the Bluetooth device at an N-th Bluetooth link time slot, said first auxiliary frame including an indication that the second device failed to correctly receive the data package from the Bluetooth device; and
    transmitting a second auxiliary frame to the second device from the first device at an (N+1)-th Bluetooth link time slot, and transmitting, from the first device after the first device correctly received the data package from the Bluetooth device and in response to the first device receiving said indication, a negative acknowledgment (NAK) signal to the Bluetooth device to request the Bluetooth device to retransmit the data package, wherein the first device determines to not forward the data package to the second device.

2. The method of data transmission according to claim 1, wherein after the first device and the second device receive the data package from the Bluetooth device at the N-th Bluetooth link time slot, the method further comprises:
    switching the second device to a state of transmitting the first auxiliary frame; and
    switching the second device to a state of receiving the second auxiliary frame, after the second device transmitting the first auxiliary frame to the first device.

3. The method of data transmission according to claim 2, wherein the first auxiliary frame comprises at least one from the group consisting of a forwarding request flag command, a first segment checking information command, a command of requesting to communicate with the Bluetooth device, and a requesting data transmitting command; and
    wherein the second auxiliary frame comprises at least one from the group consisting of a communication switching command, the forwarding request flag command, a second segment checking information command, and a command of accepting to communicate with the Bluetooth device.

4. The method of data transmission according to claim 1, wherein the first auxiliary frame comprises at least one from the group consisting of a forwarding request flag command, a first segment checking information command, a command of requesting to communicate with the Bluetooth device, and a requesting data transmitting command; and
    wherein the second auxiliary frame comprises at least one from the group consisting of a communication switching command, the forwarding request flag command, a second segment checking information command, and a command of accepting to communicate with the Bluetooth device.

5. The method of data transmission according to claim 4, wherein
    the first auxiliary frame comprises the forwarding request flag command, when the second device establishes the virtual connection with the Bluetooth device and the second device fails to correctly receive the data package transmitted from the Bluetooth device.

6. The method of data transmission according to claim 5, wherein
    while receiving the forwarding request flag command, when the first device fails to correctly receive the data package from the Bluetooth device, the first device transmits the negative acknowledgment (NAK) signal to the Bluetooth device to request the Bluetooth device to retransmit the data package;
    while receiving the forwarding request flag command, when the first device correctly receives the data package from the Bluetooth device, and the first device determines not to forward the data package to the second device, the first device transmitting the NAK signal to the Bluetooth device to request the Bluetooth device to retransmit the data package; and
    while receiving the forwarding request flag command, when the first device correctly receives the data package from the Bluetooth device, and the first device determines to forward the data package to the second device, the first device transmitting an acknowledge character (ACK) signal or the NAK signal to the Bluetooth device, and forwarding the data package to the second device.

7. The method of data transmission according to claim 6, further comprising:
    determining whether a communication quality of a current TWS link is better than a communication quality between the first device and the Bluetooth device or between the second device and the Bluetooth device;

when yes, the first device forwards the data package to the second device or the second device forwards data to the first device; or when no, the first device does not forward the data package to the second device or the second device does not forward the data package to the first device.

8. The method of data transmission according to claim 4, wherein when the first device completely receives the data package from the Bluetooth device and the second device fails to completely receive the data package from the Bluetooth device, the first auxiliary frame comprises the first segment checking information command of the data package received by the second device from the Bluetooth device, and the first device compares the first segment checking information command with a first checking information generated by the data package completely received by the first device from the Bluetooth device, to determine a first error data segment of the second device; and when the second device completely receives the data package from the Bluetooth device and the first device fails to completely receive the data package from the Bluetooth device, the second auxiliary frame comprises the second segment checking information command of the data package received by first second device from the Bluetooth device, and the second device compares the second segment checking information command with a second checking information generated by the data package completely received by the second device from the Bluetooth device, to determine a second error data segment of the first device.

9. The method of data transmission according to claim 8, wherein the first error data segment is forwarded from the first device to the second device, or the second error data segment is forwarded from the second device to the first device.

10. The method of data transmission according to claim 4, wherein when the second device is needed to directly communicate with the Bluetooth device, the first auxiliary frame comprises the command of requesting to communicate with the Bluetooth device, and the first device determining whether to accept the command of requesting to communicate with the Bluetooth device, according to a current link situation, when yes, the second auxiliary frame comprises the command of accepting to communicate with the Bluetooth device transmitted from the first device to the second device.

11. The method of data transmission according to claim 10, wherein the command of accepting to communicate with the Bluetooth device comprises a one-bit acceptance flag and two-bit flow control information, and the two-bit flow control information comprises a response flag ARQN and a data sequence number SEQN for establishing the real connection with the Bluetooth device.

12. The method of data transmission according to claim 11, wherein at an (N+2)-th Bluetooth link time slot, the second device waits to receive the first auxiliary frame transmitted from the first device; when the first auxiliary frame is received, the virtual connection is successfully switched to the real connection by the second device, and the real connection is established between the second device and the Bluetooth device; and at an (N+3)-th Bluetooth link time slot, the first device waits to receive the second auxiliary frame transmitted from the second device; when the second auxiliary frame is received, the real connection is successfully switched to the virtual connection by the first device, and the virtual connection is established between the first device and the Bluetooth device.

13. The method of data transmission according to claim 4, wherein when the second device is needed to transmit additional data to the first device, the first auxiliary frame comprises the requesting data transmitting command; and the first device determines whether to transmit the second auxiliary frame according to a current link situation; when yes, the second auxiliary frame comprises the communication switching command transmitted from the first device to the second device.

14. The method of data transmission according to claim 4, wherein when the real connection is established between the first device and the Bluetooth device and the first device fails to correctly receive the data package from the Bluetooth device, the second auxiliary frame comprises the forwarding request flag command.

15. The method of data transmission according to claim 14, wherein the first device determines whether the data package is correctly received by the second device, according to the first auxiliary frame.

16. The method of data transmission according to claim 4, wherein when the first device is needed to transmit an additional data to the second device, the first device determines whether to transmit the second auxiliary frame according to a current link situation; when yes, the second auxiliary frame comprises the communication switching command transmitted from the first device to the second device.

17. The method of data transmission according to claim 4, wherein in the step of establishing the virtual connection between the second device and the Bluetooth device, the second device establishes a virtual connection with the first device to obtain parameters of establishing the virtual connection with the Bluetooth device.

18. The method of data transmission according to claim 17, wherein in the step of the second device establishing the virtual connection with the first device to obtain the parameters of establishing the virtual connection with the Bluetooth device, the first device establishes a Bluetooth communication connection with the second device, and transmits the parameters of establishing the virtual connection with the Bluetooth device to the second device; or the first device broadcasts the parameters and the second device collects the parameters by scanning; or the second device obtains the parameters from the first device through an out of band (OOB) communication way; or the first device transmits the parameters to a third device and the second device obtains the parameters from the third device.

19. A Bluetooth True Wireless Stereo (TWS) device, comprising:

a first device configured to establish a real connection with the Bluetooth TWS device, to be switched to a state of receiving a first auxiliary frame from a second device after receiving a data package from the TWS Bluetooth device at an N-th Bluetooth link time slot, and to transmit a second auxiliary frame to the second device at an (N+1)-th Bluetooth link time slot, said first auxiliary frame including an indication that the second device failed to correctly receive the data package from the Bluetooth device; and the second device configured to establish a virtual connection with the Bluetooth TWS device, to be switched to a state of transmitting the first auxiliary frame after receiving the data package from the Bluetooth TWS device at the N-th Bluetooth link time slot, and to be switched to a state of receiving the second auxiliary frame after transmitting the first auxiliary frame to the first device, wherein the first device is configured to transmit, after the first device correctly received the data package from the Bluetooth device and in response to the first device receiving said indication, a negative acknowledgment (NAK) signal to the Bluetooth device to request the Bluetooth device to retransmit the data package, wherein the first device determines to not forward the data package to the second device.

\* \* \* \* \*